April 23, 1968   E. DUTCH   3,379,369

COMBINED MEDICAL THERMOMETER SPINNER AND STERILIZER THEREFOR

Filed Aug. 11, 1966

INVENTOR.

United States Patent Office 3,379,369
Patented Apr. 23, 1968

3,379,369
COMBINED MEDICAL THERMOMETER SPINNER
AND STERILIZER THEREFOR
Emery Dutch, 320 W. 77th St.,
New York, N.Y. 10024
Filed Aug. 11, 1966, Ser. No. 571,870
1 Claim. (Cl. 233—26)

ABSTRACT OF THE DISCLOSURE

A thermometer shaker and sterilizer apparatus is described. The apparatus includes two hollow tubular cases which are pivotally connected at a point near their open ends. During the thermometer shaking operation the case holding the thermometer is pivoted to a position substantially perpendicular to the spinning case so that the case containing the thermometer is closed off to thereby retain the thermometer within its case.

This invention relates to a combined medical thermometer spinner and sterilizer therefor, having for its primary object the provision of a simplified, hand operated thermometer spinner adapted for sterilizing the thermometer.

Known thermometer spinners require additional covering means to retain the thermometer within the spinning tubular case.

It is, therefore, a general object of this invention to provide a thermometer spinner requiring no additional covering means to retain the thermometer within the spinning tubular case.

It is a further object of this invention to provide a thermometer spinner wherein the positioning of the thermometer containing case against the spinning case effects a closure of the former.

It is also an object of this invention to provide an improved and simplified thermometer spinner which will safely and quickly whirl a thermometer to return the mercury into the bulb.

It is still further an object of the invention to provide a carrying case for the thermometer in which the thermometer can be safely stored and simultaneously disinfected after its use.

It is another object of the invention to provide a thermometer spinner wherein the user is able to clip the spinner to a pocket or belt so that the spinner may be easily carried and easily removed for ready use.

In order to achieve these and other objects, I have provided two tube cases pivotally connected to one another. One of the tube cases is opened at the end nearest the pivot connection and is adapted to receive therein the thermometer which is to be rotated after a temperature reading has been made.

To restore the mercury in the thermometer to its normal position, the thermometer is inserted into its case, which is then pivoted until it is disposed substantially perpendicularly to the other case. In this position the other or spinning tube case effectively seals off the open end of the thermometer carrying tube case.

By rotating the spinning tube case by an opposing reciprocating movement of the hands, the thermometer casing is caused to rotate about the axis of the spinning case, so that the centrifugal force created by the spinning causes the mercury in the thermometer to return to its normal position.

Further objects and features of my invention will be had from the following specification taken in connection with the accompanying drawings in which.

Figure 3:
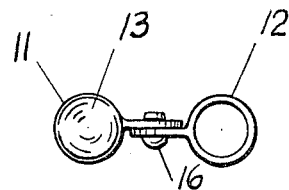
FIG. 3 is a top plan view of the cases in FIG. 1.

The thermometer spinner chosen to illustrate my invention is designed generally as 10, and comprises two tubular hollow cases 11 and 12.

Case 11, designated as the spinning tube case, is provided with a plug 13 for sealing off the interior of case 11 which is advantageously filled with any suitable disinfecting fluid.

A tab extends at right angles from the upper end of case 11, and a similar tab 15 extends from the upper, opened end of case 12. Tabs 14 and 15 are each provided with a central opening which are placed in registry, and a pivot pin 16 is placed through these openings.

Figure 2:
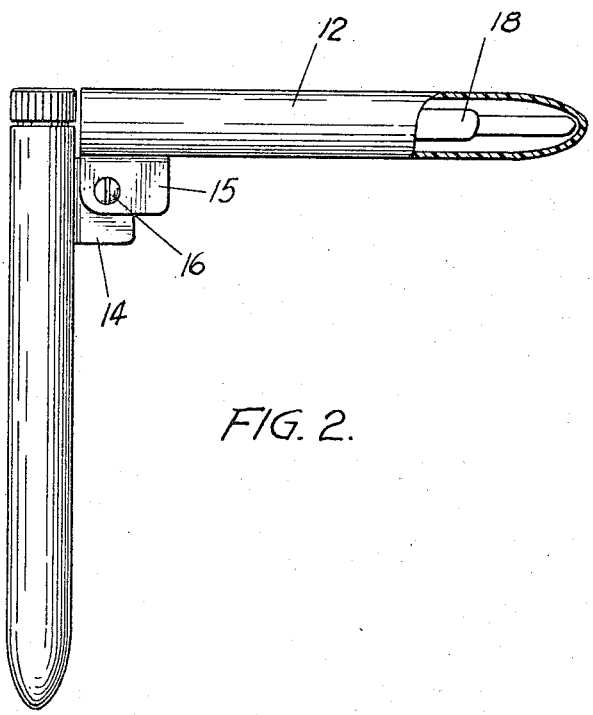
FIG. 2 is a side elevational view partly in section, showing the cases in the thermometer spinning position.
Figure 4:
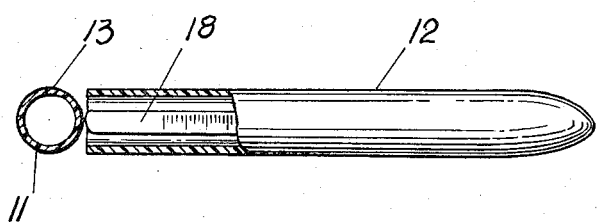
FIG. 4 is a top plan view, partly in section of the cases as shown in FIG. 2.

Pivot pin 16 is positioned with respect to tabs 14 and 15 so that case 12 can be pivoted into the position shown in FIG. 2, wherein case 12 is substantially perpendicular to spinning case 11. In this position, as shown in FIGS. 2 and 3, the open end 19 of case 11 abuts against plug 13 and the upper end of case 11, thereby preventing a thermometer 18, placed within the interior of case 12, from falling out of case 12.

In operation, the thermometer 18, once it has been used, is placed within the hollow interior of case 12. Case 12 is then pivoted about screw 16 into the operating position of FIG. 2, wherein thermometer 18 is retained within case 12 by the abutment of the open end of case 12 against the outer wall of case 11.

Case 11 is then placed between the palms of the hands and rotated in a conventional manner by the rapid opposite reciprocating movement of the hands. The spinning of case 11 produces a centrifugal force upon the mercury in thermometer 18 causing the mercury to return to its original or normal position.

Figure 1:
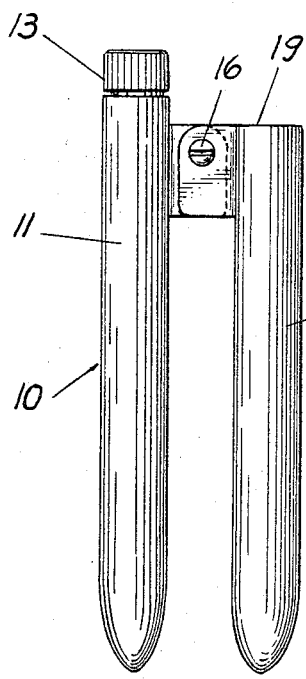
FIG. 1 is a side elevation view of my thermometer spinner showing both cases in the inoperative position.

Thermometer 18 is then removed from case 12 and after removing plug 13, thermometer 18 is placed in the fluid within case 11. Plug 13 is replaced, and case 12 is pivoted back into the inoperative position of FIG. 1. It will be appreciated that in this position the thermometer spinner may be readily carried in the pocket or belt of the physician or nurse, by placing one of the cases 11 or 12 either in the pocket or behind the belt. The other case extends over the edge of the pocket or belt, so that the lower edge of tabs 14 and 15 rest on the upper edge of the pocket flap or belt.

While I have described my invention with respect to one embodiment thereof, it will be obvious that modifications may be made thereto without departing from the spirit and scope of this invention as defined in the appended claims.

What I claim is:

1. An apparatus for shaking down and sterilizing a thermometer comprising, a tubular case open at one of its ends and containing a longitudinal bore for receiving therein a thermometer; a tubular spinning case having an outer wall and a longitudinal bore provided therein and open at one end thereof, a plug snugly inserted into the open end of said spinning case, and means pivotally mounting said tubular case to said spinning case, said pivoting means being positioned on each of said cases so that said tubular case can be pivoted between a first, storage position and a second, spinning position wherein in said storage position said tubular case lies in a side-by-side, substantially parallel relationship to said spinning case, and in said spinning position, said tubular case is positioned at a substantially perpendicular relation to said spinning case so that the open end of said tubular case is in such close proximity to said plug and to the outer wall of said spinning case that said spinning case thereby retains the thermometer within said tubular case.

References Cited

UNITED STATES PATENTS

| | | | |
|---|---|---|---|
| 523,351 | 7/1894 | Hugershoff | 233—26 |
| 780,315 | 1/1905 | Wetherill | 233—26 |
| 950,741 | 3/1910 | Berry | 233—26 |
| 998,529 | 7/1911 | Ketcham | 233—17 |
| 1,904,776 | 4/1933 | Bailey | 233—26 X |
| 1,929,696 | 10/1933 | Kashiwagi | 233—26 X |

HENRY T. KLINKSIEK, *Primary Examiner.*